(12) United States Patent
Andtsjoe et al.

(10) Patent No.: US 7,851,567 B2
(45) Date of Patent: Dec. 14, 2010

(54) PROCESS FOR POLYMERIZING OLEFINS IN THE PRESENCE OF AN OLEFIN POLYMERIZATION CATALYST

(75) Inventors: Henrik Andtsjoe, Porvoo (FI); Michiel Bergstra, Helsinki (FI); Ralf Karlsson, Henaan (SE); Klaus Nyfors, Porvoo (FI); Urban Thorngren, Goeteborg (SE)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 12/065,101

(22) PCT Filed: Aug. 8, 2006

(86) PCT No.: PCT/EP2006/007854

§ 371 (c)(1),
(2), (4) Date: May 1, 2008

(87) PCT Pub. No.: WO2007/025640

PCT Pub. Date: Mar. 8, 2007

(65) Prior Publication Data

US 2009/0137753 A1 May 28, 2009

(30) Foreign Application Priority Data

Sep. 2, 2005 (CN) ................... 2005 1 0099673

(51) Int. Cl.
*C08F 2/00* (2006.01)
*C08F 110/02* (2006.01)
(52) U.S. Cl. .................. 526/65; 526/67; 526/70; 526/86; 526/352
(58) Field of Classification Search .......... 526/64, 526/65, 70, 72, 73, 77, 86, 87, 90, 96
See application file for complete search history.

(56) References Cited

U.S. PATENT DOCUMENTS

| 4,543,399 A | * | 9/1985 | Jenkins et al. | ............... | 526/70 |
| 4,588,790 A | | 5/1986 | Jenkins, III et al. | | |
| 4,740,550 A | | 4/1988 | Foster | | |
| 5,326,835 A | * | 7/1994 | Ahvenainen et al. | ........... | 526/64 |
| 6,258,902 B1 | * | 7/2001 | Campbell et al. | ............. | 526/82 |
| 6,455,643 B1 | * | 9/2002 | Harlin et al. | ................... | 526/65 |

FOREIGN PATENT DOCUMENTS

| CN | 1130387 | | 9/1996 |
| CN | 1333787 | | 1/2002 |
| EP | 72165 | A1 * | 2/1983 |
| EP | 0699213 | | 3/1996 |
| EP | 0810235 | | 12/1997 |
| EP | 0887379 | | 12/1998 |
| EP | 1415999 | A1 * | 5/2004 |
| WO | 9425495 | | 11/1994 |
| WO | 9428032 | | 12/1994 |
| WO | 9618662 | | 6/1996 |
| WO | 9958584 | | 11/1999 |
| WO | 0022040 | | 4/2000 |
| WO | 2004039847 | | 5/2004 |

* cited by examiner

*Primary Examiner*—David Wu
*Assistant Examiner*—Elizabeth Eng
(74) *Attorney, Agent, or Firm*—Roberts Mlotkoski Safran & Cole, P.C.

(57) ABSTRACT

The present invention relates to a process for the preparation of multimodal ethylene homo- or copolymers in at least two stages, the process comprising preparation of a first ethylene homo- or copolymer fraction in a loop reactor in slurry phase, preparation of a second ethylene homo- or copolymer fraction in a gas phase reactor, by using a catalyst not containing an inorganic oxide support, and operating the gas phase reactor in such conditions that at least part of the gas is recycled, and that at least a part of the recycled gas is condensed and the (partially) condensed gas is re-introduced into the gas phase reactor.

4 Claims, No Drawings

PROCESS FOR POLYMERIZING OLEFINS IN THE PRESENCE OF AN OLEFIN POLYMERIZATION CATALYST

BACKGROUND OF THE INVENTION

Usually, a polyethylene composition comprising at least two polyethylene fractions, which have been produced under different polymerization conditions resulting in different (weight average) molecular weights and molecular weight distributions for the fractions, is referred to as "multimodal". The prefix "multi" relates to the number of different polymer fractions the composition is consisting of. Thus, for example, a composition consisting of two fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

A number of processes designed to produce multimodal polyethylene are known in the art. Many of them involve cascaded reactors, such as slurry reactors and/or gas phase reactors. While many of them are able to produce materials having good mechanical properties combined with good processability and good homogeneity, there is still room to improve their process economy and stability.

FIELD OF THE INVENTION

The present invention relates to a process of polymerizing ethylene in two or more stages to produce multimodal polyethylene materials. More particularly, the invention relates to a process comprising a loop and a gas phase reactor, where the material has a good homogeneity and the fines level of the polymer powder is low. Moreover, the process is stable in operation, has a good production economy and a reduced investment cost.

DESCRIPTION OF RELATED ART

Processes to produce bimodal materials for high density PE film are known from e.g. CN-C-1130387, assigned to Borealis. This patent discloses a process where ethylene is polymerized, optionally together with comonomers, in cascaded loop and gas phase reactors using a catalyst not containing an inorganic oxide support. While the process is capable of producing homogeneous bimodal ethylene polymers its production economy can still be improved.

SUMMARY OF THE INVENTION

The aim of the present invention is to provide a process which is able to produce polyethylene materials over a wide density range, and the resulting polyethylene materials have a good processability in the end use applications and an excellent homogeneity. Moreover, the process is stable in commercial operation, has a low investment cost and good production economy. In particular, it is an aim to provide a process where homogeneous polyethylene film and pipe materials having a good processability can be produced.

The invention is based on the surprising finding that with the process of the invention the formation of polymer agglomerates can be reduced and the production economy can be improved, while producing multimodal, for example bimodal, ethylene polymers having excellent mechanical properties, good homogeneity and good processability.

The present invention therefore provides a process for the preparation of multimodal ethylene homo- or copolymers in at least two stages, the process comprising (i) preparation of a first ethylene homo- or copolymer fraction in a loop reactor in slurry phase, (ii) preparation of a second ethylene homo- or copolymer fraction in a gas phase reactor, by using a catalyst not containing an inorganic oxide support, and operating the gas phase reactor in such conditions that at least part of the gas is recycled, and that at least a part of the recycled gas is condensed and the (partially) condensed gas is re-introduced into the gas phase reactor.

Preferably, the ethylene homo- or copolymer produced in the first stage (i) has a lower (weight average) molecular weight than the homo- or copolymer produced in the second stage (ii).

Furthermore, preferably, the ethylene homo- or copolymer produced in the first stage (i) has a relatively high density, more preferably has a higher density than the homo- or copolymer produced in the second stage (ii).

Still further, preferably the ethylene homo- or copolymer produced in the first stage (i) has a higher density than the final multimodal polyethylene composition.

Preferably, the melt flow rate $MFR_2$ of the ethylene homo- or copolymer produced in the first stage (i) is at least 200 g/10 min.

The loop reactor is preferably operated by using a $C_3$-$C_6$-alkane as a diluent.

Furthermore, preferably, the ethylene homo- or copolymer produced in the second stage (ii) has a relatively low density.

Still further, preferably the ethylene homo- or copolymer produced in the second stage (ii) has a lower density than the final multimodal polyethylene composition.

In a preferred embodiment, in the second stage (ii) an ethylene copolymer is produced by polymerising ethylene monomers with one or more types of other alpha-olefin monomers.

Preferably, the alpha-olefins are selected from 1-butene, 1-hexene or 1-octene.

Furthermore, preferably so the $MFR_2$ of the final multimodal polymer composition is at most 1.0 g/10 min.

In a preferred embodiment of the process, the (partially) condensed recycled gas is introduced into the bottom of the gas phase reactor.

DETAILED DESCRIPTION OF THE INVENTION

Definitions

By "loop reactor" is meant a reactor made of a conduit forming a closed loop and through which the polymer slurry, where the catalyst and the polymer produced in the reactor are suspended in a fluid phase consisting of diluent, monomer, eventual comonomers and hydrogen. The fluid phase may also contain small amounts of additives, e.g. to reduce the static electricity.

By "gas phase reactor" is meant any mechanically mixed or fluidized bed reactor, where polymer particles are suspended in a gas consisting of monomer, comonomer(s) and eventually hydrogen and/or inert gas. Preferably the gas phase reactor comprises a mechanically agitated fluidized bed reactor with superficial gas velocity of at least 0.2 m/s.

By "fluidised bed" it is meant a bed of growing polymer particles and active catalyst particles within the gas phase reactor. The bed is supported by a continuous upwardly moving gas stream that has been introduced from the bottom of the bed. The gas stream is collected from the top of the bed, compressed, cooled and reintroduced to the bottom of the bed.

By "condensed mode operation" it is meant a method of operating a fluidised bed gas phase reactor. In this mode of operation the recycle gas collected from the top of the fluidised bed is cooled to such temperature that at least part of the recycle gas is condensed. The partly condensed recycle gas is then reintroduced to the bottom of the fluidised bed reactor. Condensed mode of operation as such is known and a description of the method is given, for instance, in U.S. Pat. No. 4,543,399, U.S. Pat. No. 4,588,790, EP 699213 and WO 94/25495.

"Melt flow rate", or abbreviated MFR, is a measure of the melt viscosity and thus also of the molecular weight of the polymer. A high value of MFR corresponds to a low molecular weight. It is measured by pressing the polymer melt through a standard cylindrical die at a standard temperature in a special measuring device (melt indexer) equipped with a standard piston under a standard load. For polyethylene, the melt flow rate is measured at 190° C. The abbreviation MFR is usually provided with a numerical subscript, which indicates the load under which the measurement was made. Thus, $MFR_2$ designates that the measurement was performed under 2.16 kg load and $MFR_{21}$ designates that the measurement was performed under 21.6 kg load. The determination of MFR is described e.g. in ISO 1133 C4, ASTM D 1238 and DIN 53735.

The Polymer Composition

The polymer compositions which can be produced using the process according to the invention are multimodal ethylene (co)polymers, which consist of at least two ethylene polymer fractions. One of the fractions is a copolymer of ethylene and an alpha-olefin and it has a relatively high average molecular weight and a relatively high content of comonomer. Another one of the fractions is a homopolymer of ethylene or a copolymer of ethylene and an alpha-olefin and it has a relatively low average molecular weight and optionally a relatively low content of comonomer. By "relatively high" and "relatively low" it is here meant that the "relatively high" average molecular weight is higher than the average molecular weight of the final multimodal polymer and the "relatively low" average molecular weight is lower than the average molecular weight of the final multimodal polymer.

The fraction having a relatively low molecular weight has
melt flow rate $MFR_2$ within 200-1000 g/10 min, preferably within 300-600 g/10 min
density between 940-980 kg/m³
the weight fraction of low molecular weight material should be within 5-95%, preferably 20-55% and in particular 30-50% of the final polymer composition, and the fraction having a relatively high molecular weight should have such average molecular weight and comonomer content that the final bimodal ethylene (co)polymer composition has the desired melt flow rate and density.

The process is especially advantageous in the production of ethylene (co)polymer compositions having a broad molecular weight distribution and a high average molecular weight, and in particular compositions which are used in applications where homogeneity is important, such as film or pipe. Typically, in these compositions the $MFR_2$ of the polymer of low molecular weight fraction is higher than 300 g/10 min. Alternatively or additionally, the $MFR_5$ of the final ethylene (co) polymer composition is lower than 0.7 g/10 min or $MFR_{21}$ of the final composition is lower than 20 g/10 min.

Thus, one ethylene (co)polymer composition which beneficially can be produced with the process according to the present invention is a high density film material, which comprises a low molecular weight fraction having
melt flow rate $MFR_2$ within 300-1000 g/10 min, preferably within 300-600 g/10 min
density between 960-980 kg/m³
the weight fraction of low molecular weight material within 5-95%, preferably 30-50% and in particular 35-50% of the final polymer composition, and a high molecular weight fraction such that the final ethylene (co)polymer composition has
melt flow rate $MFR_{21}$ within 3-50 g/10 min, preferably within 3-15 g/10 min
density within 940-965 kg/m³

Another ethylene (co)polymer composition which beneficially can be produced with the process according to the present invention is a high density pipe material, which comprises a low molecular weight fraction having
melt flow rate $MFR_2$ within 300-1000 g/10 min, preferably within 300-600 g/10 min
density between 960-980 kg/m³
the weight fraction of low molecular weight material within 20-60%, preferably 35-60% and in particular 40-55% of the final polymer composition, and a high molecular weight fraction such that the final ethylene (co)polymer composition has
melt flow rate $MFR_{21}$ within 5-50 g/10 min, preferably within 7-15 g/10 min
density within 940-965 kg/m³

Another ethylene (co)polymer composition which beneficially can be produced with the process according to the present invention is a linear low density film material, which comprises a low molecular weight fraction having
melt flow rate $MFR_2$ within 250-1000 g/10 min, preferably within 300-500 g/10 min
density between 940-960 kg/m³
the weight fraction of low molecular weight material within 5-95%, preferably 20-50% and in particular 35-50% of the final polymer composition, and a high molecular weight fraction such that the final ethylene (co)polymer composition has
melt flow rate $MFR_{21}$ within 10-50 g/10 min, preferably within 15-25 g/10 min
density within 915-930 kg/m³

The process according to the present invention is also suitable for production of a high density blow moulding material for manufacturing bottles, which comprises a low molecular weight fraction having
melt flow rate $MFR_2$ within 250-1000 g/10 min, preferably within 250-400 g/10 min density between 960-980 kg/m$^3$ the weight fraction of low molecular weight material within 5-95%, preferably 30-50% and in particular 40-50% of the final polymer composition, and a high molecular weight fraction such that the final ethylene (co)polymer composition has melt flow rate MFR$_{21}$ within 10-40 g/10 min, preferably within 20-30 g/10 min density within 945-965 kg/m$^3$ Polymerization Process To produce the polymer compositions, ethylene is polymerized in the presence of a suitable Ziegler-Natta catalyst, at an elevated temperature and pressure. Polymerization is carried out in a cascade comprising a loop reactor and a gas phase reactor. The low molecular weight component is produced in the loop reactor and the high molecular weight component is produced in the gas phase reactor.

In addition to the actual polymerization reactors used to produce the bimodal ethylene homo- or copolymer, the polymerization reaction system can also include a number of additional reactors, such as prereactors. The prereactors include any reactor for prepolymerizing or precontacting the catalyst or modifying the olefinic feed, if necessary. All reactors of the polymerization process are preferably arranged in a cascade.

According to the invention, the polymerization comprises the steps of subjecting ethylene, hydrogen and optionally comonomers to a first polymerization reaction in a first reaction zone or reactor, recovering the first polymerization product from the first reaction zone, feeding the first polymerization product to a second reaction zone or reactor, feeding additional ethylene, comonomer(s) and optional hydrogen to the second reaction zone subjecting the additional ethylene and optional hydrogen and/or comonomer to a second polymerization reaction in the presence of the first polymerization product to produce a second polymerization product, and recovering the second polymerization product from the second reaction zone.

Slurry Polymerization

Thus, in the first step of the process, ethylene with the optional comonomer(s) together with the catalyst is fed into the first polymerization reactor. Along with these components hydrogen as a molar mass regulator is fed into the reactor in an amount required to achieve the desired molar mass of the polymer. Alternatively, the feed of the first reactor can consist of the reaction mixture from a previous reactor, if any, together with added fresh monomer, optional hydrogen and/or comonomer and cocatalyst. In the presence of the catalyst, ethylene and the optional comonomer will polymerize and form a product in particulate form, i.e. polymer particles, which are suspended in the fluid circulated in the reactor.

According to the invention, the catalyst is a Ziegler-Natta catalyst which contains magnesium and titanium as active components. The catalyst has not been supported on an inorganic oxide support, such as silica, but the magnesium chloride present in the catalyst acts as a support material.

The polymerization medium typically comprises the monomer (i.e. ethylene), a hydrocarbon diluent, hydrogen and, optionally, comonomer(s). The fluid in the loop reactor is either a liquid or a so called supercritical fluid, where the temperature and the pressure in the reactor are higher than the critical temperature and pressure of the fluid mixture. The polymer slurry is continuously circulated through the reactor by means of a circulation pump.

The hydrocarbon diluent used in the loop reactor mainly comprises a $C_3$-$C_6$ aliphatic hydrocarbon, such as propane, n-butane, isobutane, pentane or hexane, or a mixture of these. It should be noted, that the diluent may also contain minor amounts of lighter and/or heavier hydrocarbons which are typically found in industrially used hydrocarbon fractions. It is preferred to use light diluents, such as propane, n-butane or isobutane, since these can readily be separated from the polymer. In particular propane is suitable to be used as a diluent, since it allows the operation in supercritical conditions at a relatively low temperature.

The conditions of the loop reactor are selected so that at least 20%, preferably at least 35%, of the whole production is produced in the loop reactor. On the other hand, not more than 55% of the total production, preferably not more than 50%, of the whole production should be produced in the loop reactor, otherwise the homogeneity of the product is likely to be poor. The temperature is within the range of 40 to 110° C., preferably in the range of 70 to 100° C. The reaction pressure is in the range of 25 to 100 bar, preferably 35 to 80 bar.

It is also possible to perform the first polymerization stage in more than one loop reactor. In such a case the polymer suspension is fed without separation of inert components and monomers, either intermittently or continuously, into the following loop reactor, which operates at a lower pressure than the previous loop reactor.

The heat of polymerization is removed by cooling the reactor by means of a cooling jacket. The residence time in the slurry reactor must be at least 10 minutes, preferably 20-100 minutes, to obtain a sufficient yield of polymer.

As discussed above, hydrogen is fed into the loop reactor to control the molecular weight of the polymer. Hydrogen is added into the reactor so, that the molar ratio of hydrogen to ethylene in the fluid phase of the reactor is at least 100 mol hydrogen/kmol ethylene, preferably 300-2000 mol hydrogen/kmol ethylene. It should be noted that the exact amount of hydrogen depends on the desired molecular weight (or MFR) of the polymer produced in the first stage, and thus no exact value can be given.

Comonomer can be introduced into the loop reactor to control the density of the polymer produced in the first polymerization stage. If the final ethylene (co)polymer should have a high density above 940 kg/m$^3$, the molar ratio of the comonomer to the ethylene should be at most 200 mol comonomer/kmol ethylene, and preferably no comonomer is added into the loop reactor. If the final ethylene (co)polymer should have a low density below 930 kg/m$^3$, the molar ratio of the comonomer to the ethylene should be between 200-1000 mol comonomer/kmol ethylene, preferably between 300-800 mol comonomer/kmol ethylene. Again, it should be noted that the exact amount of comonomer depends on the desired comonomer content (or density) of the polymer produced in the first stage, and thus no exact value can be given.

The comonomer can be selected from a group of alpha-olefins. Preferably it is an alpha-olefin selected from the group comprising 1-butene, 1-hexene, 4-methyl-1-pentene and 1-octene. The comonomer should not have a boiling point close to the boiling point of the diluent, to avoid the diluent recovery from becoming uneconomical.

If the density of the ethylene (co)polymer produced in the loop reactor is higher than 960 kg/m$^3$, it is advantageous to perform the polymerization in supercritical conditions, above the critical temperature and critical pressure of the fluid which forms the reaction mixture. Typically, the temperature then exceeds 90° C. and the pressure exceeds 55 bar.

The polymer slurry may be withdrawn from the loop reactor either continuously or intermittently. Continuous removal is preferred as it leads to more economical operation. A method of continuous withdrawal is disclosed in WO 2004/039847.

The pressure of the first polymerization product including the reaction medium is reduced after the first reaction zone in order to evaporate volatile components of the product, e.g. in a flash pipe or a flash tank. As the result of the flashing, the product stream containing the polyethylene is freed from hydrogen and can be subjected to a second polymerization in the presence of additional ethylene to produce a high molar mass polymer.

The flashing may be conducted at a suitable temperature and pressure, as long as the major part of the hydrogen is removed from the polymer stream. Thus, the pressure may be within the range of 1 to 30 bar, preferably from 3 to 25 bar. The temperature may be from 10 to 100° C., preferably from 30 to 90° C. It has been found out that especially good results have been obtained by conducting the flash stage at a relatively high pressure, like 15 to 30 bar, in particular 15 to 25 bar. Then part of the diluent used in the loop reactor remains as a liquid. Upon entry into the gas phase reactor this liquid evaporates and assists in cooling the gas phase reactor. Even more preferably, the mixture of fluid and polymer leaving the flash stage may be cooled to condense the diluent remaining in said mixture. The cooling can be effected by using any suitable method known in the art. One particularly suitable example is to introduce the mixture containing polymer and fluid from the flash into the gas phase reactor by using a jacketed pipe, where the cooling agent present in the jacket cools the mixture to a desired temperature. The temperature to which the mixture should be cooled should be such that at least a substantial part of the diluent present in the mixture condenses. This temperature depends on the diluent and the pressure after the flash stage and can be, for example, between 30 and 70° C.

Gas Phase Polymerization

The second reactor is preferably a gas phase reactor where ethylene and preferably comonomers are polymerized in a gaseous reaction medium.

The gas phase reactor can be an ordinary fluidized bed reactor, although other types of gas phase reactors can be used. In a fluidized bed reactor, the bed consists of growing polymer particles which have been transferred from the first reaction zone or which have been formed in the bed of the gas phase reactor, as well as the active catalyst which is dispersed within the growing polymer particles. A fluidizing gas is introduced into the bed from the bottom through a fluidization grid. The flow rate of the fluidizing gas is such that the particles are fluidized, i.e. the bed shall act as a fluid. The fluidizing gas consists of monomer and eventually comonomer(s), and optionally hydrogen and inert gases, like nitrogen, propane, n-butane or isobutane. The fluidized bed reactor may also be equipped with a mechanical mixer.

As stated above, the high molecular weight fraction is produced in the gas phase reactor. Hydrogen is added into the reactor to control the molecular weight of the final polymer. The concentration of hydrogen in the fluidizing gas shall be such that the molar ratio of hydrogen to ethylene is lower than 200 mol hydrogen/kmol ethylene, preferably lower than 100 mol/kmol. It should be noted that the exact amount of hydrogen depends on the desired MFR of the final ethylene (co) polymer, and thus no exact value can be given.

Comonomer can also be introduced into the gas phase reactor to control the density of the final ethylene (co)polymer. If the final ethylene (co)polymer should have a high density above 940 kg/m$^3$, the molar ratio of the comonomer to the ethylene should be at most 200 mol comonomer/kmol ethylene, and preferably no comonomer is added into the loop reactor. If the final ethylene (co)polymer should have a low density below 930 kg/m$^3$, the molar ratio of the comonomer to the ethylene should be between 200-1000 mol comonomer/kmol ethylene, preferably between 300-800 mol comonomer/kmol ethylene. Again, it should be noted that the exact amount of comonomer depends on the desired comonomer content (or density) of the final ethylene (co)polymer and thus no exact value can be given.

If a comonomer was used in the loop reactor, the comonomer(s) used in gas phase reactor may be the same or different than used in the loop reactor. The comonomer used in the gas phase reactor is an alpha-olefin or a mixture of two or more alpha-olefins, preferably alpha-olefins selected from the group consisting of 1-butene, 1-hexene, 4-methyl-1-pentene and 1-octene.

The gas phase reactor may be operated in the temperature range 50 to 115° C., preferably between 60 and 110° C. The pressure in the reactor is typically between 10 and 40 bar, and the partial pressure of monomer between 1 and 20 bar.

The inventors have found that the operation of the gas phase reactor can be more stable and the amount of sheet-like polymer and polymer chunks can be reduced when the gas phase reactor is operated in a specific manner. Without wishing to be bound to any specific theory, the inventors believe that the presence of the condensable components in the fluidizing gas prevents the growing polymer particles within the fluidized bed from overheating, thus reducing their tendency for forming agglomerates or chunks.

The fluidizing gas is withdrawn from the top of the reactor, compressed, cooled and recycled to the bottom of the gas phase reactor. It has been found advantageous to cool the fluidizing gas to such a temperature, where a part of the fluidizing gas condenses as a liquid. The thus formed two-phase mixture is then reintroduced into the bottom of the gas phase reactor. Upon entry into the reactor the liquid evaporates, thus contributing to the cooling of the fluidized bed. This kind of operation is known as condensed mode of operation.

To increase the fraction of condensable components in the fluidizing gas, an inert condensable hydrocarbon may be introduced into the gas phase reactor. Suitable examples of such hydrocarbons are $C_3$-$C_6$ aliphatic hydrocarbons and their mixtures. It is preferred to use a hydrocarbon or hydrocarbon mixture which can readily be separated from the comonomer(s) used in the gas phase reactor. Especially useful it is to use the same hydrocarbon or hydrocarbon mixture that is used as a diluent in the loop reactor. Thus, it has been found useful to use propane as a diluent in the loop reactor and to add propane into the gas phase reactor to increase the fraction of condensable gases. Then, for instance 1-butene and/or 1-hexene can suitably be used as a comonomer in the gas phase reactor. The amount of the condensable hydrocarbon is not fixed and may be selected freely. Good results have been obtained when the content has been from 20 to 80%, and preferably from 40 to 75% by weight from the total fluidisation gas.

As it was discussed above, the condensable component can suitably be introduced into the gas phase reactor together with the polymer stream from the loop reactor. Then, advantageously, the mixture is cooled after the flashing stage so that at least a major fraction of the diluent present in the mixture condenses. Upon entry to the gas phase reactor the diluent evaporates, thereby removing the heat of the reaction. As the diluent is in the direct contact with the polymer particles its evaporation effectively prevents the particles from overheating when the polymerisation starts.

The fraction of condensed circulation gas depends on the product to be produced, the production rate, and the temperature within the fluidised bed and so on. Typically, less than about 15% by weight of the fluidization gas is condensed. Good results have been obtained when from 3 to 10% and especially from 5 to 8% by weight of the fluidization gas is condensed. The fraction of condensed gas is determined from the fluidizing gas in the recycle gas line after the cooler but before the point of entry into the gas phase reactor.

The polymer may be withdrawn from the gas phase reactor continuously or intermittently. The continuous withdrawal is preferred, since it is more economical and results in a more stable operation of the gas phase reactor. A suitable method for withdrawing the polymer continuously is disclosed in CN-A-1333787.

The pressure of the second polymerization product including the gaseous reaction medium can then be released after the second reactor in order to optionally separate part of the gaseous and possible volatile components of the product, e.g. in a flash tank. The overhead stream or part of it may be recycled into the gas phase reactor.

The production split between the loop reactor and the gas phase reactor is between 5-95:95-5. Preferably 20 to 50%, in particular 35 to 50% of the ethylene homopolymer or copolymer is produced in loop reactor at conditions to provide a polymer having an $MFR_2$ of 300 g/10 min or more, and constituting the low molar mass portion of the polymer, and 80 to 50%, in particular 65 to 50% of the ethylene homo- or copolymer is produced at such conditions that the final polymer has $MFR_{21}$ of less than 50 g/10 min, in particular 3 to 50 g/10 min and constituting the high molar mass portion of the polymer.

Catalyst

The solid catalyst component used in the process according to the invention is a Ziegler-Natta catalyst consisting of magnesium and titanium as active metals. No inorganic oxide carrier is used to support the catalyst. Such catalyst components are commercially available and they have also been disclosed in patents, for example CN-C-1130387 and EP-A-810235.

The solid catalyst component is used in combination with activators generally known in the art. Preferred activators are aluminium alkyl compounds, such as aluminium trialkyls, aluminium dialkyl halides, aluminium dialkyl hydrides and aluminium alkyl sesquihalides. Aluminium trialkyls are especially preferred activators. Examples of these compounds are trimethylaluminium, triethylaluminium, tripropylaluminium, tri-isobutylaluminium and trioctylaluminium. Examples of aluminium dialkyl halides are dimethylaluminium chloride and diethylaluminium chloride. An example of aluminium alkyl sesquihalides is ethylaluminium sesquichloride.

The solid component and the activator are used in ratios that are known in the art. Thus, the ratio of aluminium in the activator to the titanium in the solid catalyst component may be selected from the range of 1 to 1000 mol/mol, preferably from 5 to 500 mol/mol and more preferably from 5 to 50 mol/mol. However, it should be kept in mind that the actually useful ratio depends on the type of the solid catalyst component, the type of the activator and the content impurities in the reaction mixture which are able to react with the catalyst thereby inactivating it.

Blending and Compounding

The polymer obtained from the reactor is in the form of powder. Generally, the film blowers are not able to use the polymer in the powder form. The powder is transformed to pellets in a compounding step where the polymer is first mixed with additives, like antioxidants and process stabilisers, and then melt homogenised in an extruder and finally pelletised.

The extruder used in the compounding can be of any type known in the art. It may be either a single screw extruder which contains only one screw or a twin screw extruder which contains two parallel screws, or a combination of these. Preferably a twin screw extruder is used.

The twin screw extruder may be of either co-rotating or counter-rotating type. In a co-rotating twin screw extruder the screws rotate in the same direction while in a counter-rotating twin screw extruder the screws rotate in the opposite directions. The counter-rotating twin screw extruder has the advantage of giving better homogeneity on a certain level of specific energy input. On the other hand, co-rotating twin screw extruder generally degrades the polymer less on a certain level of specific energy input.

Description of Analytical Methods

Melt Flow Rate

Melt flow rate of the polymer was determined according to ISO 1133 at 190° C. under a load of 2.16 kg ($MFR_2$).

Density

Density of the polymer was determined according to ISO 1183-1987.

Example

A polymerisation plant comprising a loop and a gas phase reactor was operated so that ethylene, propane diluent and hydrogen were introduced into a loop reactor together with a commercially available magnesium dichloride supported titanium catalyst sold under trade name Lynx 200 by Engelhard. Triethylaluminium was used as an activator so that the ratio of aluminium in the activator to the titanium in the catalyst was 10 mol/mol. The operating temperature of the reactor was 95° C. and pressure 60 bar. Ethylene homopolymer was produced at a rate of about 15 tons per hour and the $MFR_2$ of the polymer after the loop reactor was about 300 g/10 min. Thus, the low molecular weight component was made in the loop reactor. The density of the polymer was not measured, but prior experience has indicated that a homopolymer of this MFR has a density of about 974 kg/m$^3$. The conditions within the loop reactor can be found in Table 1.

The polymer slurry was withdrawn from the reactor and introduced into a separation stage where the major part of the hydrocarbons was removed from the polymer. The polymer containing the active catalyst was transferred into a gas phase reactor, where additional ethylene, hydrogen and 1-butene comonomer were added. Additionally, some propane remaining in the polymer after the separation stage was introduced into the gas phase reactor together with the polymer to increase the dew point of the gas mixture. The polymerization was thus continued to produce the high molecular weight component so that a polymer composition having a density of 948 kg/m$^3$ and the $MFR_{21}$ of 15 g/10 min. The polymer was withdrawn from the gas phase reactor at a rate of about 30 tons per hour. The conditions within the gas phase reactor can be found in Table 1.

The polymer was mixed with additives, such as antioxidant and process stabiliser and pelletised using a counter-rotating twin screw extruder. The final polymer had a melt index $MFR_{21}$ of 17 g/10 min and a density of 0.948 kg/dm$^3$.

A campaign of two weeks could be run without any operational problems.

TABLE 1

Process operation data

| Example | 1 |
|---|---|
| Loop reactor: | |
| Temperature, ° C. | 95 |
| Pressure, bar | 64 |
| C$_2$, mol-% | 3.5 |
| H$_2$/C$_2$, mol/kmol | 840 |
| Solids content, wt-% | 41 |
| Production rate, t/h | 15 |
| Gas phase reactor: | |
| Temperature, ° C. | 85 |
| Pressure, bar | 20 |
| C$_2$, mol-% | 10 |
| H$_2$/C$_2$, mol/kmol | 30 |
| C$_4$/C$_2$, mol/kmol | 70 |
| C$_3$, mol-% | 65 |
| Recycle gas temperature, ° C. | 41 |
| Fraction of condensed gas, wt-% | 7 |
| Production rate, t/h | 15 |

The invention claimed is:

1. A process for the preparation of multimodal ethylene homo- or copolymers in at least two stages, the comonomer being selected from the group consisting of 1-butene, 1-hexene, 4-methyl-1-pentene and 1-octene, the process comprising
    (i) preparation of a first ethylene homo- or copolymer fraction in a loop reactor in slurry phase comprising a diluent,
    (ii) preparation of a second ethylene homo- or copolymer fraction in a gas phase reactor, by using a catalyst not containing an inorganic oxide support, introducing an inert hydrocarbon into the gas phase reactor which is the same as the diluent used in the loop reactor and is selected from propane, butanes, pentanes and hexanes and their mixtures and operating the gas phase reactor in such conditions that at least part of the gas is recycled, and that at least a part of the recycled gas is condensed and the (partially) condensed gas is re-introduced into the gas phase reactor, wherein at least part of the inert hydrocarbon is introduced into the gas phase reactor together with the polymer as a stream and wherein
    (iii) the stream comprising diluent, polymer and unreacted ethylene, hydrogen and optionally alpha-olefin comonomers withdrawn from the loop reactor is subjected to a flash stage at a pressure between 15 and 30 bar so that at least part of a fluid phase is flashed out to produce a dense stream containing the polymer and a minor part of the fluid phase and a lean stream containing a major part of the fluid phase;
    (iv) cooling said dense stream comprising the polymer so that at least a substantial part of the diluent contained therein condenses;
    (v) introducing said cooled dense stream into the gas phase reactor; and
    (vi) cooling said gas phase reactor by evaporation of said condensed diluent.

2. The process according to claim 1, further comprising the steps of:
    (i) continuously or intermittently introducing a catalyst comprising magnesium and titanium as active constituents and not comprising an inorganic oxide support into a loop reactor;
    (ii) continuously or intermittently introducing ethylene, hydrogen and a diluent comprising a C$_3$-C$_6$ hydrocarbon into the loop reactor;
    (iii) optionally, continuously or intermittently introducing one or more alpha-olefin comonomers into the loop reactor;
    (iv) operating the loop reactor in conditions to effect polymerization of ethylene and optionally said alpha-olefin comonomers;
    (v) continuously or intermittently withdrawing said stream comprising diluent, polymer and unreacted ethylene, hydrogen and optionally alpha-olefin comonomers from the loop reactor;
    (vi) directing at least part of the stream comprising the polymer into said gas phase reactor;
    (vii) continuously or intermittently introducing ethylene, one or more alpha-olefin comonomers and optionally hydrogen into the gas phase reactor to establish an upwardly moving fluidizing stream within said gas phase reactor;
    (viii) continuously withdrawing the fluidizing gas stream from the top of the gas phase reactor;
    (ix) cooling said withdrawn fluidizing gas stream to a temperature where at least part of said stream condenses;
    (x) reintroducing said partially condensed fluidizing gas stream into the bottom of the gas phase reactor and cooling said gas phase reactor by evaporation of said condensed fluidizing gas;
    (xi) operating said gas phase reactor in conditions to effect copolymerization of ethylene and alpha-olefin comonomer;
    (xii) continuously or intermittently withdrawing a stream of polymer and fluidizing gas from the fluidized bed;
    (xiii) recovering the polymer from said stream.

3. The process according to claim 1 wherein the fraction of the condensed fluidization gas is less than 15% by weight.

4. The process according to claim 3, wherein the fraction of condensed fluidization gas is from 3 to 10% by weight.

* * * * *